United States Patent [19]

Fujisaki et al.

[11] Patent Number: 5,027,207
[45] Date of Patent: Jun. 25, 1991

[54] TELEVISION SIGNAL TRANSMISSION SYSTEM UTILIZING TDMA TECHNIQUE

[75] Inventors: Masataka Fujisaki; Kiyotaka Fujisaki, both of Tokyo; Hitoshi Mori, Hachioji; Itugu Takeishi, Machida, all of Japan

[73] Assignees: Japan Business Television, Inc., Tokyo; Kabushiki Kaisha Toshiba, Kawasaki, both of Japan

[21] Appl. No.: 410,351

[22] Filed: Sep. 21, 1989

[51] Int. Cl.⁵ .................. H04N 7/08; H04N 7/087
[52] U.S. Cl. ................................. 358/142; 358/146; 358/147
[58] Field of Search ................ 358/142, 146, 147; 340/825.04; 455/34

[56] References Cited

U.S. PATENT DOCUMENTS

| | | | |
|---|---|---|---|
| 3,647,949 | 3/1972 | Closs et al. | 358/146 |
| 4,215,370 | 7/1980 | Kirk, Jr. | 358/146 |
| 4,593,318 | 6/1986 | Eng et al. | 358/146 |
| 4,829,569 | 5/1989 | Seth-Smith et al. | 358/147 |
| 4,903,126 | 2/1990 | Kassatly | 358/146 |
| 4,916,539 | 4/1990 | Galumbeck | 358/147 |

*Primary Examiner*—John W. Shepperd
*Assistant Examiner*—Michael D. Parker
*Attorney, Agent, or Firm*—Oblon, Spivak, McClelland, Maier & Neustadt

[57] ABSTRACT

A televison signal transmission system comprising transmitting stations and receiving stations. Each transmitting station has a signal-transmitting circuit and a signal-superposing circuit. The signal-superposing circuit superposes a discriminant signal on a television signal during a vertical-blanking interval of the television signal. The discriminant signal is required for selecting the television signal. The signal-transmitting circuit inserts the television signals, containing the discriminant signal, into the communication channel assigned to the transmitting station, and then transmits the television signal to the receiving stations. Each receiving station has a signal-receiving circuit, a signal-detecting circuit, and a signal-selecting circuit. The signal-receiving circuit receives the television signals transmitted from the transmitting stations. The signal-detecting circuit detects the discriminant signals from television signal in each communication channel received by said signal-receiving circuit. The signal-selecting circuit selects the television signal inserted in the desired communication channel from among the television signals received by the signal-receiving circuit, in accordance with the disciminant signals detected by said signal-detecting circuit.

11 Claims, 7 Drawing Sheets

| CHANNEL DISCRIMINANT SIGNAL | | COMMUNICATION CHANNEL |
|---|---|---|
| 1 | 2 | |
| 0 | 0 | CHA |
| 0 | 1 | CHB |
| 1 | 0 | CHC |
| 1 | 1 | CHD |

TELEVISION SIGNAL TRANSMISSION SYSTEM UTILIZING TDMA TECHNIQUE

BACKGROUND OF THE INVENTION

1. Field of the Invention

The present invention relates to a television signal transmission system using TDMA (Time Division Multiple Access) technique, which transmit television signals from a plurality of transmitting stations to a plurality of receiving stations.

2. Description of the Related Art

TDMA technique is to transmit a TDMA signal on one carrier. The TDMA signal consists of a plurality of TDMA frames recurring at predetermined period. Each of these frames is time-divided into a plurality of channels. The channels are assigned to a plurality of transmitting stations in, for example, one-to-one correspondence. Each transmitting station inserts signals in the channel assigned to it, and transmit the signals to receiving stations. The TDMA technique is advantageous in two respects. First, it is versatile. Second, it helps to increase the use efficiency of the carrier.

Recently a system has been in consideration by present inventors which utilizes the TDMA technique, thereby to transmit television signals from a plurality of transmitting stations to a plurality of receiving stations. The system comprises transmitting stations, more receiving stations, and, for example, a communications satellite. A transponder is incorporated in the communications satellite which can relay a plurality of carriers having different frequencies. One of the carriers is assigned to all transmitting stations. Each TDMA frame of the TDMA signal transmitted from each transmitting station o this carrier is time-divided into a plurality of communication channels. More precisely, each transmitting station inserts television signals an every image frame in the channel which is assigned to the transmitting station, and transmit the television signal to the communication satellite. Each of the television signals consists of a video signal and a audio signal. The video signal is frequency-modulated before being transmitted from the transmitting station. The audio signal is converted to a digital signal and then transmitted from the transmitting station on a subcarrier which has been modulated by QPSK technique. The transponder incorporated in the communications satellite receives the television signals from the transmitting stations, insert them in the various channels, and transmits them to the receiving stations. Each receiving station receives the television signals from the satellite, which are inserted in the various channels, and selects the television signals relayed and inserted in the desired channel. The television signals, thus selected, are stored into an image memory. When necessary, these signals are read from the image memory and processed, thereby displaying a still picture or a strobe-effect sequence of pictures on a monitor screen.

In order to select the desired communication channel among many, each receiving station needs to obtain a receiving interval as to when television signals inserted in the desired channel are received by the receiving station. This interval can be given to the receiving station by two methods. The first method is to insert time slots into the channels of each TDMA frame, and channel discriminant codes are set in the time slots, so that these codes are transmitted to the receiving stations. The second method is to transmit channel discriminant signals from each transmitting station to the receiving stations through ground communication lines.

The first method has a problem. Since a time slot is inserted in each communication channel, the region of the channel for containing television signals is smaller than otherwise. Consequently, the television signals can carry but less data, and their quality is inevitably lower than in the case where no time slots are inserted in the communication channel. In order to maintain the quality of the television signals, the TDMA frame can be time-divided into less channels, whereby each channel has an excessive region for a time slot. If the TDMA frame is time-divided into less channels, however, the efficiency of transmitting television signals will decrease.

The second method also has a problem. When this method is employed, the signal-transmitting system requires a number of ground communication lines, and is inevitably a large-scale one. Every time new receiving stations are added to the system, new ground communication lines must be installed for the new receiving stations. Therefore, it is difficult, from an economical point of view, to set up new receiving stations in the system. Further, the transmitting stations must undergo complex control in order to minimize or eliminate the between the time at which each receiving station receives the television signals from the satellite and the time at which the receiving station receives the channel-identifying signals transmitted via the ground communication line.

SUMMARY OF THE INVENTION

An object of the present invention is to provide a television signal transmission system in which an channel discriminant signal, which each receiving station requires to select some of the television signal transmitted to it, can be easily transmitted from each transmitting station to all receiving stations, without using time slots or additional communication lines.

Another object of the invention is to provide a television signal transmission system in which channel discriminant signals can be correctly transmitted from transmitting stations to receiving stations, even if the television signals transmitted from the transmitting stations to the receiving stations have insufficient S/N ratios.

Still another object of this invention is to provide a television signal transmission system in which new, additional receiving stations can be installed without difficulties.

In order to attain the above objects, the following specific measures are taken in the present invention. Each transmitting station has a signal-transmitting circuit for transmitting television signals, and a signal-superposing circuit for superposing an discriminant signal on a television signal. The television signal with the discriminant signal superposed on it is inserted into the communication channel assigned to the transmitting station and is transmitted by the signal-transmitting circuit. Further each receiving station has a signal-receiving circuit for receiving television signals, a signal-detecting circuit for detecting discriminant signals from the television signals received by the signal-receiving circuit, during the vertical-blanking intervals of the television signals, and a signal-selecting circuit for selecting desired ones of the television signals in accordance with the results of the detection performed by the signal-detecting circuit.

Since the discriminant signals are transmitted, superposed on the television signals, from the transmitting stations to the receiving stations, no communication channels need to have time slots for containing the discriminant signals. Therefore, the television signals can carry sufficient data, and their quality is adequately high. Hence, it is unnecessary to time-divide the communication frame into less channels in order to maintain the quality of the television signals at a desired value, the efficiency of transmitting television signals remain sufficiently high.

Furthermore, since no additional ground communication lines are required to transmit the discriminant signals from the transmitting stations to the receiving stations, the television signal transmission system is of a smaller scale than otherwise. Hence, the running cost of the system is relatively low. Also, since ground communication lines need not be used, it is easier, than otherwise, to add new receiving stations to the system, and/or to move the receiving stations to other sites.

According to the present invention, the discriminant signals are formed of a carrier having such a frequency that the television signals will have the lowest frequency-spectrum level when they are superposed on this carrier. Hence, even if the S/N ratio of the television signals decreases due to the quality-deterioration of the communication channels, the discriminant signals can be correctly detected from the television signals having frequency components over a broad range, by passing the carrier through a narrow band-pass filter.

DETAILED DESCRIPTION OF THE PREFERRED EMBODIMENTS

Figure 1:
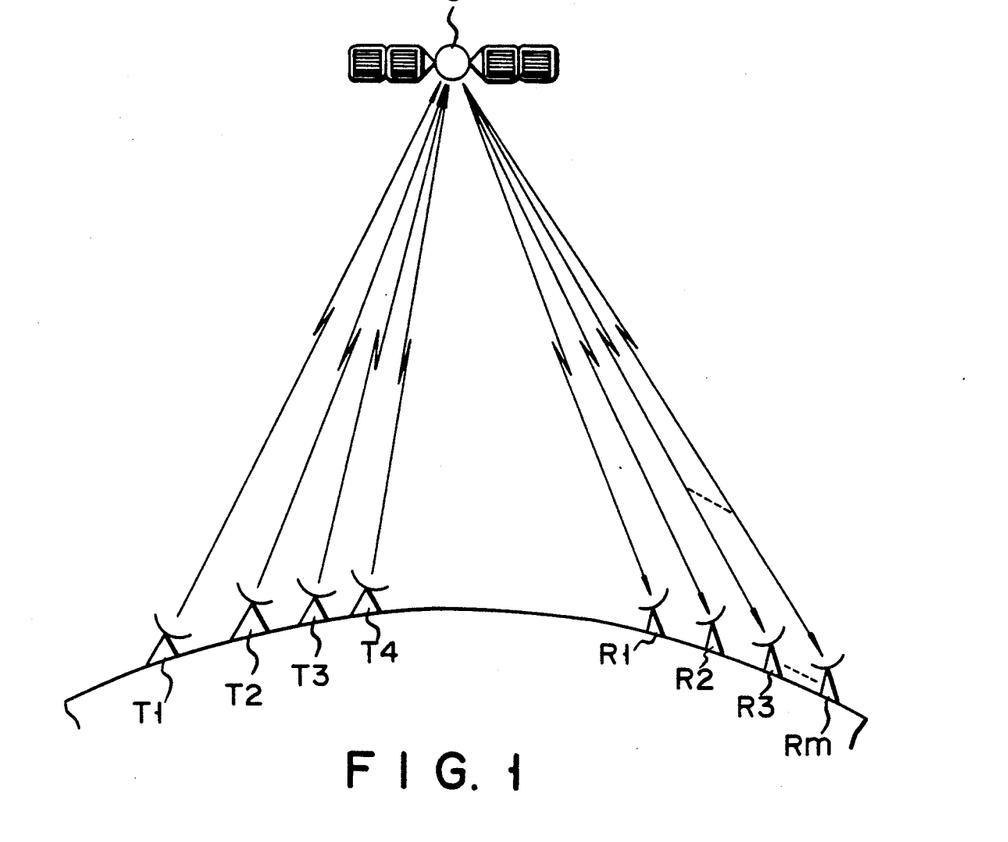
FIG. 1 is a schematic view illustrating a television signal transmission system according to the present invention.

FIG. 1 is a schematic view showing a television transmission system according to the present invention. As this figure shows, the system comprises four transmitting stations T1 to T4 built on the ground, a number of receiving stations R1, R2, R3, ... Rm also built on the ground, and a communications satellite S. Each transmitting station is designed to broadcast various TV programs, or more precisely, to transmit television signals. The communications satellite S has a transponder for relaying carriers having different frequencies. One of the carriers is used in the television signal transmission system, in order to transmit television signals from the transmitting stations T1 to T4 to the receiving stations R1, R2, R3, ... Rm via the communications satellite S.

Figure 2:
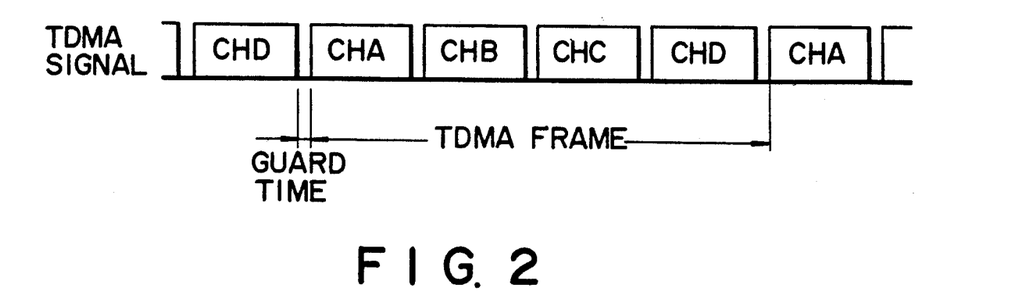
FIG. 2 is the frame format of the TDMA signals transmitted from the transmitting stations of the system shown in FIG. 1, to the receiving stations of the system.

TDMA technique is to transmit a TDMA signal on one carrier. The TDMA signal consists of a plurality of TDMA frames recurring at predetermined period. As is shown in FIG. 2, each TDMA frame is time-divided into four communication channels CHA, CHB, CHC, and CHD, which are assigned to the transmitting stations T1, T2, T3, and T4, respectively. In each transmitting station, an image frame is inserted into the channel assigned to the station, before they are transmitted to the satellite S. To be precise, in the station T1, an image frame is inserted into the channel CHA; in the station T2, an image frame is inserted into the channel CHB; in the station T3, an image frame is inserted into the channel CHC; in the station T4, an image frame is inserted into the channel CHD. As is shown in FIG. 2, the channels CHA, CHB, CHC, and CHD are spaced apart from one another by guard time. The guard time will absorb the difference between the time any transmitting station transmits television signals and the time any other transmitting station transmits television signals. By virtue of the guard time, the adjacent communication channels do not interfere.

Each transmitting station must transmit television signals, during the transmission interval provided for the communication channel assigned to the station. Therefore, it is necessary to set four transmission intervals for the communication channels CHA, CHB, CHC, and CHD assigned to the transmission stations T1, T2, T3, and T4, respectively. In this regard, the transmitting station T1 functions as master station, and the transmitting stations T2, T3, and T4 function as slave stations. More precisely, the station T1 set the transmission interval for the channel CHA, and transmit television signal during this transmission interval. The communications satellite S relay the television signal to the transmitting stations T2, T3, and T4, as well as to the receiving stations R1 to Rm. The transmitting stations T2, T3, and T4 receive the television signal from the transmitting station, and then set the transmission intervals for the channels CHB, CHC, and CHD, respectively, on the basis of receiver interval of the television signal.

In each transmitting station, a video tape recorder is operated, reproducing video frames from the tape, each video frame during the transmission interval for the communication channel assigned to the transmitting station. The television signals, which form the video frame, are input to the main section of the transmitting station and transmitted from the transmitting station.

Figure 3:
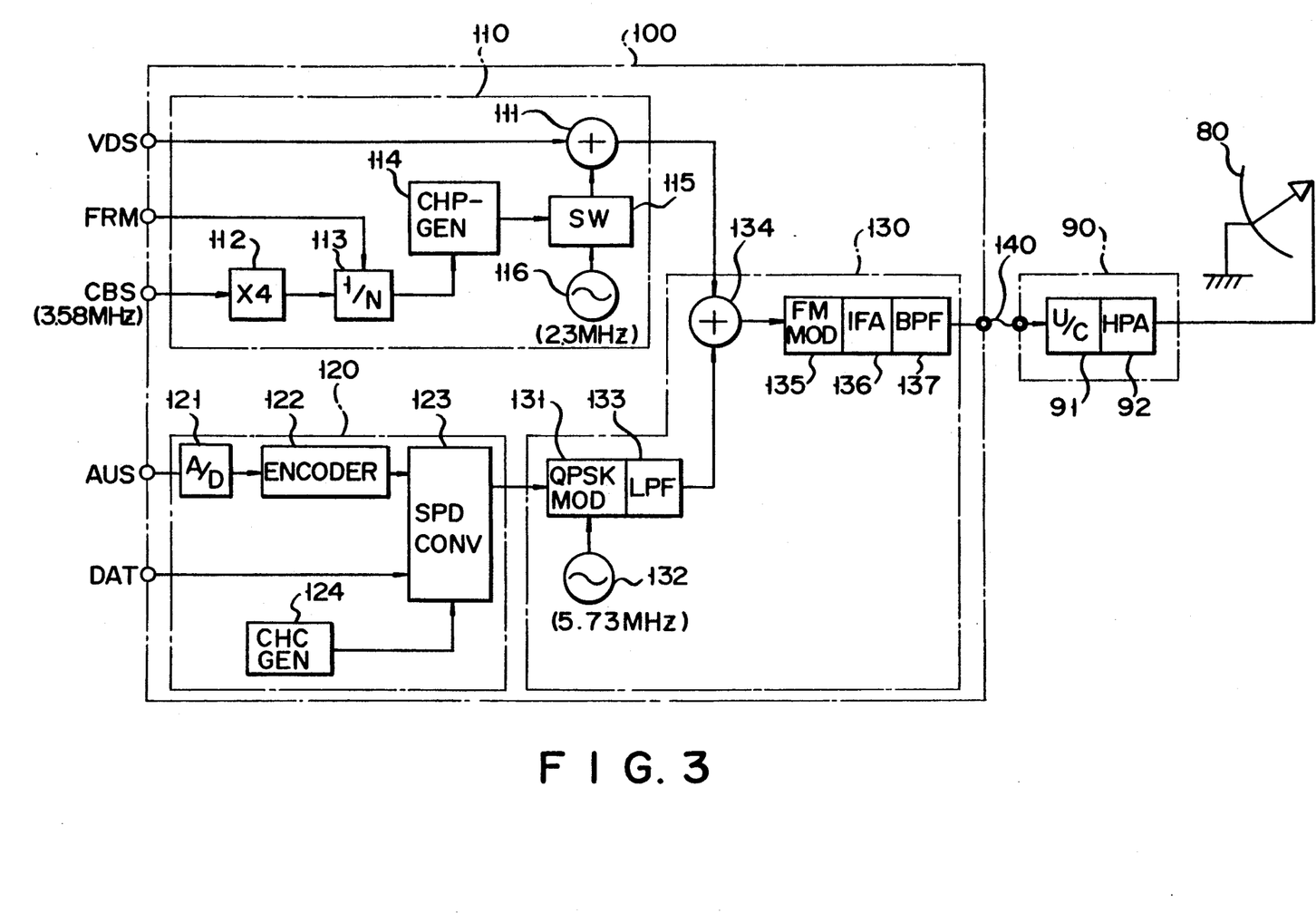
FIG. 3 is a block diagram showing the main components of each of the transmitting station illustrated in FIG. 1.

FIG. 3 illustrates the main section of each transmitting station. The main section comprises a transmitting antenna 80, a transmitter 90, and a signal-forming device 100. The antenna 80 and the transmitter 90 are located outdoors, and the signal-forming device 100 is installed indoor. The antenna 80 is connected to the transmitter 90. The transmitter 90 is connected to the signal-forming device 100 by a coaxial cable 140.

The signal-forming device 100 comprises a signal-superposing unit 110, an audio/data multiplexing unit 120, and a modulating unit 130. The unit 110 is designed to superposed a channel discriminant signal on a video signal.

Figure 4:
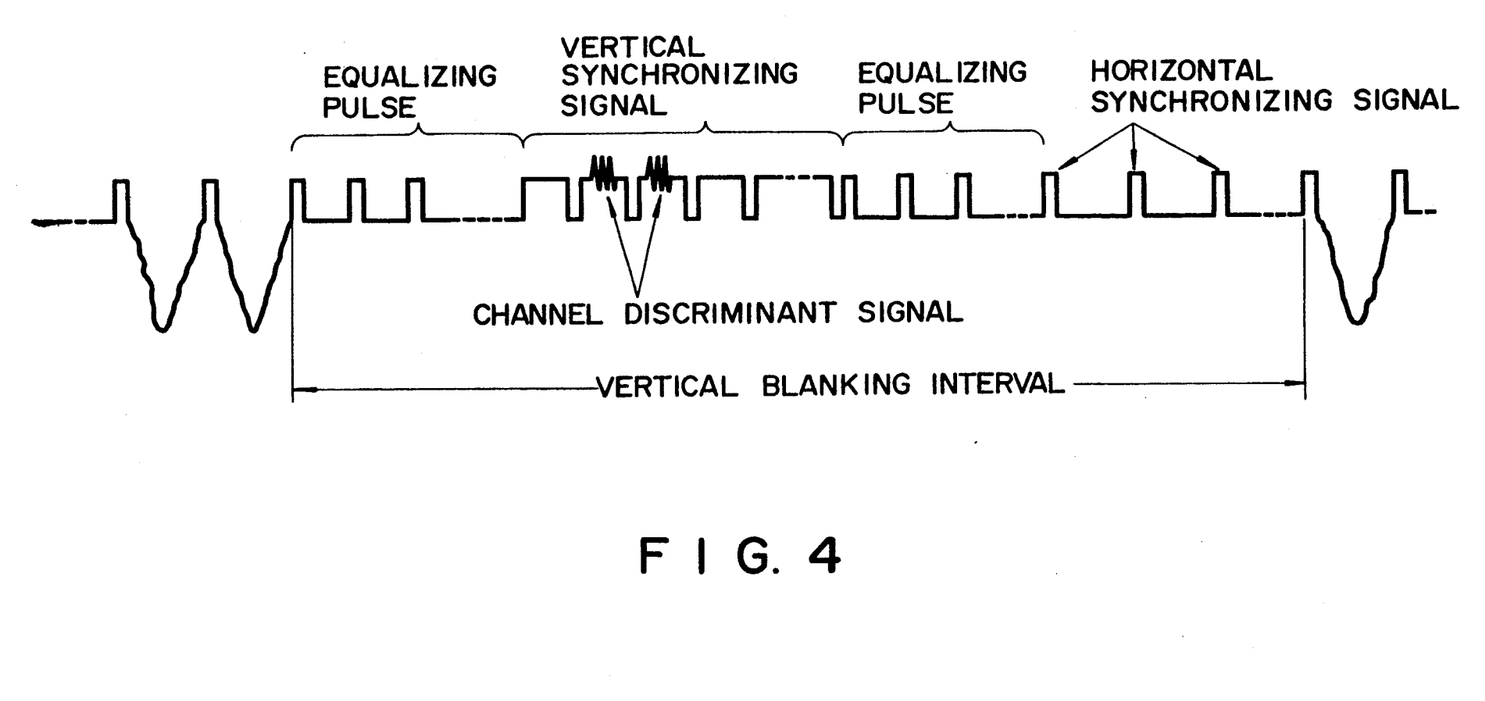
FIG. 4 shows the waveform of a television signal on which a channel discriminant signal is superposed.
Figure 5:
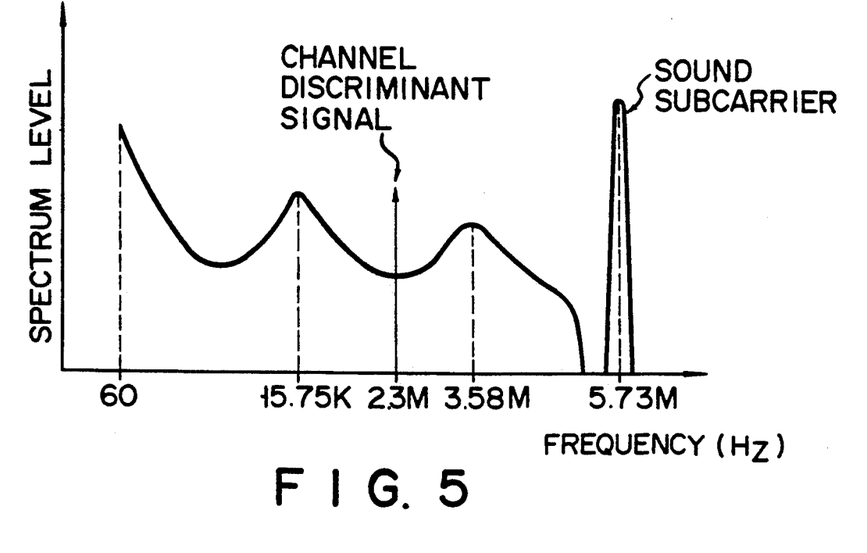
FIG. 5 is a spectrum diagram for explaining the desired value for the frequency of the channel discriminant signals.
Figure 6:
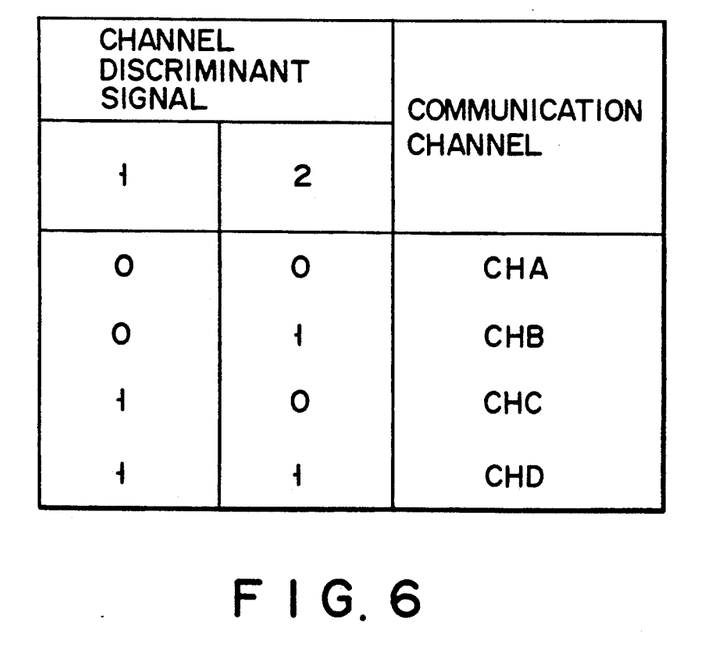
FIG. 6 is a table representing the correspondence between the channel discriminant signals, on the one hand, and the communication channels, on the other.

The signal-superposing unit 110 has a signal synthesizer 111, a frequency multiplier 112, a frequency divider 113, a timing-pulse generator 114, a switching circuit 115, and an oscillator 116. Each television signal reproduced from the video tape consists of a composite video signal VDS and an audio signal AUS. The composite video signal VDS is a combination of a video signal and various synchronizing signals. The signal VDS is supplied to the signal synthesizer 111. The frequency multiplier 112 and the frequency divider 113 are used to generate a vertical synchronizing signal and a horizontal synchronizing signal, both being synchronous with the TDMA frame. More specifically, the frequency multiplier 112 multiplies the frequency (3.58 MHz) of a color burst signal CBS by the factor of 4, and supplies the signal CBS, thereby frequency-multiplied, to the frequency divider 113. The frequency divider 113 divides the frequency of the color burst signal CBS at a predetermined frequency-dividing ratio, in synchronism with a frame signal FRM which is synchronous with the TDMA frame, generating a vertical synchronizing signal and a horizontal synchronizing signal, both being synchronous with the TDMA frame. Both synchronizing signals are input to the timing-pulse generator 114. The timing-pulse generator 114 generates, from the cynchronizing signals, a timing pulse which will determine the time at which to superpose a channel discriminant signal on the composite video signal VDS. The timing pulse is generated at the same time as the vertical synchronizing signal during the vertical-blanking interval of the composite video signal VDS. The timing pulse is supplied to the switching circuit 115. The circuit 115 is opened for the duration of the timing pulse, thus allowing the passage of the carrier signal output by the oscillator 116 to the signal synthesizer 111. The carrier signal is used as a channel discriminant signal. The signal synthesizer 111 superposes a channel discriminant signal on the vertical synchronizing signal during the vertical-blanking interval, as is shown in FIG. 4. The carrier signal has such a frequency, for example, 2.3 MHz, at which the spectrum level of the television signal is minimum over the frequency band of the television signal, as can be understood from FIG. 5. As is shown in FIG. 4, the channel discriminant signal consists of two signals. These two signals represent the communication channel assigned to the transmitting station. FIG. 6 shows how four channel discriminant signals correspond to the communication channels CHA, CHB, CHC, and CHD of the TDMA frame. In this figure, "0" indicates the absence of a signal, and "1" indicates the presence of a signal.

The audio/data multiplexing unit 120 has an A/D converter 121, an encoder 122, a speed converter 123, and a channel-discriminant signal generator 124. The A/D converter 121 converts the audio signal AUS to a digital signal. The digital signal output by the A/D converter 121 is input to the encoder 122. The encoder 122 encodes the digital audio signal, and adds an error-correcting code to the digital audio signal. The error-correcting code will be used for error control. The digital audio signal output by the encoder 122 is input to the speed converter 123. The speed converter 123 converts the speed of the digital audio signal, whereby excessive bits are formed in the digital audio signal. The excessive bits represent data DAT and the channel discriminant code output by the channel-discriminant signal generator 124. The channel discriminant code is a two-bit code shown in FIG. 6.

The modulating unit 130 has a QPSK modulator 131, an oscillator 132, a low-pass filter 133, a synthesizer 134, a frequency modulator 135, an intermediate-frequency amplifier 136, and a band-pass filter 137. The QPSK modulator 131 performs QPSK modulation on the subcarrier (5.73 MHz) generated by the oscillator 132 in accordance with the audio/data multiplexed signal output from the speed converter 123. The sound subcarrier output by the QPSK modulator 131 is input to the low-pass filter 133, whereby the harmonic component of the sound subcarrier is filtered out. The sound subcarrier output from the filter 133 is input to the synthesizer 134. The synthesizer 134 synthesizes the sound subcarrier with the composite video signal supplied form the signal-superposing unit 110, forming a television signal. In other words, the sound subcarrier is frequency-divided and multiplexed with the composite video signal. The television signal, thus generated, is input to the frequency modulator 135. The frequency modulator 135 modulates the frequency of the television signal. The frequencymodulated television signal is amplified by the intermediate-frequency amplifier 136 and is converted into a burst signal by means of a transmitting switch (not shown) so that it can be inserted into the communication channel assigned to the transmitting station. The frequency band of the television signal is limited by means of the band-pass filter 137, and is then supplied from the signal-forming device 100 to the transmitter 90 through the coaxial cable 140.

The transmitter 90 comprises a frequency converter 91 and a large-power amplifier 92. The amplifier 92 is made of a travelling-wave tube. The frequency converter 91 converts the frequency of the burst signal supplied from the modulating unit 130, thus generating a microwave signal. The amplifier 92 amplifies the microwave signal. The amplified microwave signal, i.e., the burst signal output from the transmitter 90, is supplied to the transmitting antenna 80 and transmitted therefrom to the satellite S.

Figure 7:
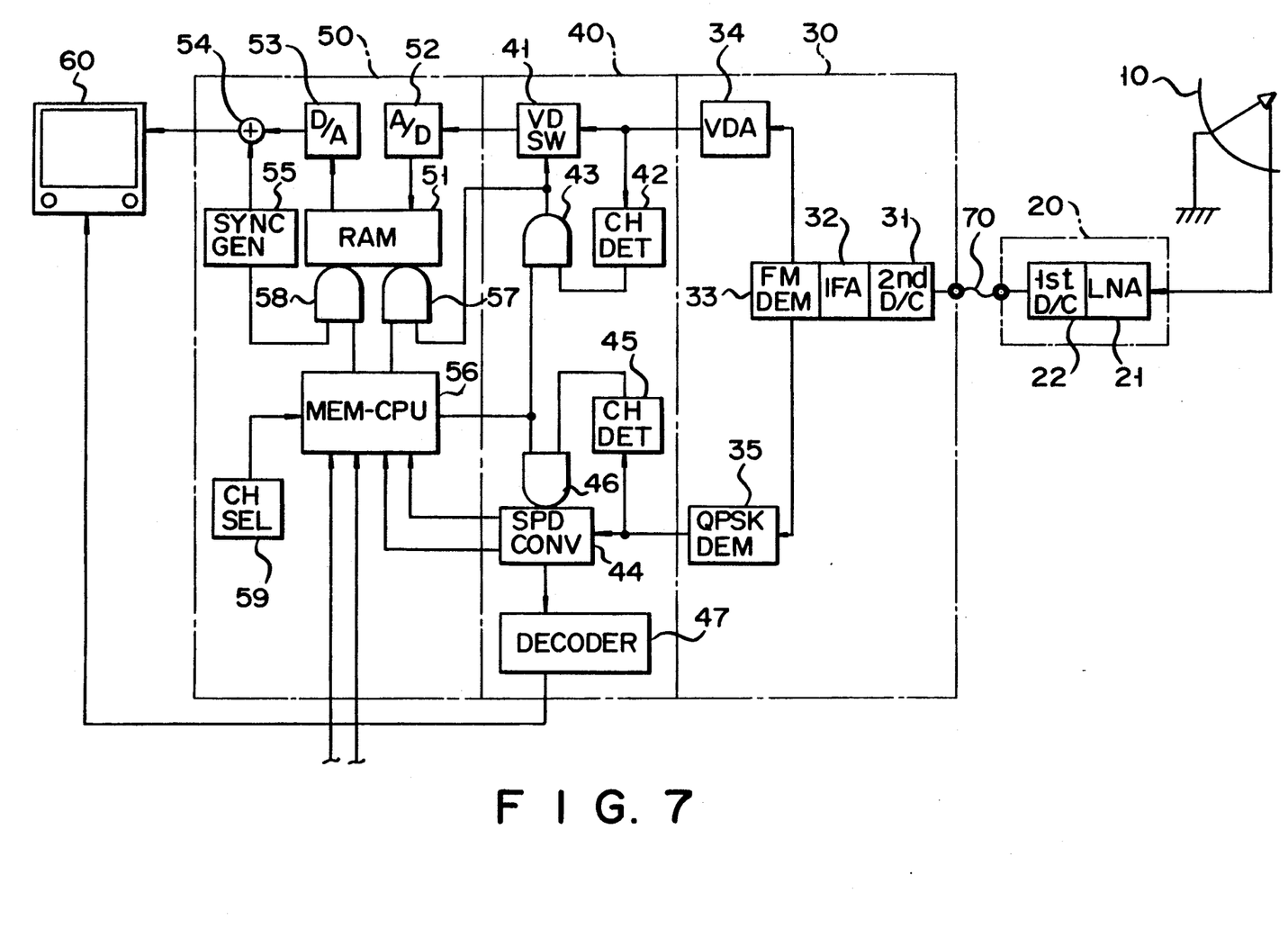
FIG. 7 is a block diagram showing the main components of each of the receiving stations illustrated in FIG. 1.

FIG. 7 is a block diagram illustrating, in detail, the main section of each of the receiving stations R1 to Rm. As is shown in this figure, each receiving station comprises a receiving antenna 10, a receiver 20, an FM-signal receiver 30, a switching device 40, a video memory device 50, and a video monitor 60. The antenna 10 and the receiver 20 are located outdoors, and the FM-signal receiver 30, the switching device 40, the video memory device 50, and the video monitor 60 are installed indoors. The receiver 20 is connected to the frequency modulator 30 by means of a coaxial cable 70.

The receiver 20 comprises a low-noise amplifier 21 and a first frequency converter 22. The amplifier 21 amplifies the television signal caught by the antenna 10. The first frequency converter 22 converts the frequency of the television signal. The output signal of the first frequency converter 22 is supplied to the frequency modulator 30 through the coaxial cable 70.

The FM-signal receiver 30 comprises a second frequency converter 31, an intermediate-frequency amplifier 32, a frequency demodulator 33, a video amplifier 34, and a QPSK demodulator 35. The second frequency converter 31 converts the television signal supplied from the receiver 20, into a signal having an intermediate frequency. The intermediate-frequency signal is amplified by the intermediate-frequency amplifier 32 and input to the frequency demodulator 33. The frequency demodulator 33 performs frequency demodulation on the intermediate-frequency signal, and frequency-divides the frequency-demodulated signal into a video signal and an sound subcarrier. The sound subcarrier is input to the QPSK demodulator 35. The QPSK demodulator 35 performs QPSK demodulation on the sound subcarrier, thus reproducing the audio/data multiplex signal.

The switching device 40 has a circuit for processing video signals, and a circuit for processing the audio/data signals. The video-signal processing circuit comprises a video switch 41, a channel detector 42, and an AND circuit 43. The video signal output by the video amplifier 34 of the FM-signal receiver 30 is input to the video switch 41 and the channel detector 42. The channel detector 42 has a narrow band-pass filter for detecting the frequency (2.3 MHz) of the channel discriminant signal. Every time the channel detector 42 receives a video frame of the composite video signal, the detector 42 detects the channel discriminant signal (two bits) from the vertical synchronizing signal contained in the composite video signal. The AND circuit 43 compares the channel discriminant signal detected by the detector 42 with the desired-channel code output from the control circuit 56 incorporated in the video memory device 50. When the signals compared are found to be identical, the video switch 41 is turned on for the interval required for receiving the communication channel identified by the channel discriminant signal. Therefore, only the composite video signal, which the video amplifier 34 outputs while the station is receiving the communication channel, is stored into the video memory device 50 through the video switch 41.

The audio/data signal-processing circuit of the switching device 40 comprises a speed converter 44, a channel detector 45, an AND circuit 46, and a decoder 47. The multiplexed audio/data signal, which has been output by the QPSK demodulator 35 of the FM-signal receiver 30, is input to the speed converter 44 and the channel detector 45. The channel detector 45 detects the channel discriminant code from the multiplexed audio/data signal. The AND circuit 46 compares the channel discriminant code with the code which represents the desired channel and output from the control circuit 56 of the video memory device 50. When the codes compared are found to be identical, the AND circuit outputs a signal for the time equal to the time for receiving the desired channel. The signal is supplied to the speed converter 44. Hence, the speed converter 44 performs reverse speed conversion on the multiplexed audio/data signal output from the QPSK demodulator 35, thus separating the data and the digital audio signal from each other. The digital audio signal is input to the decoder 47. The decoder 47 decodes the digital audio signal, corrects this signal, and converts the signal into an analog signal. The analog audio signal is supplied to video monitor 60. The speaker incorporated in the video monitor 60 reproduces sound from the audio signal. Meanwhile, the data is input to the control circuit 56 of the video memory device 50.

The video memory device 50 comprises a RAM 51, an A/D converter 25, a D/A converter 53, a sync signal generator 55, and a signal synthesizer 54. The RAM 51 can store video signals forming one video frame. The A/D converter 52 converts the video signal output by the switching device 40, into a digital signal. The digital signal is stored into the RAM 51. The D/A converter 53 converts the digital signal read from the RAM 51 to an analog signal. The analog signal is supplied to the signal synthesizer 54. The sync signal generator 55 is designated to generate various synchronizing signals such as vertical synchronizing signals, horizontal synchronizing signals, and equalizing pulses - all required for reproducing the composite video signals. The signal synthesizer 54 synthesizes the video signal output from the D/A converter 53, with the synchronizing signals generated by the sync signal generator 55, thereby reproducing a composite video signals. The composite video signal, thus reproduced, is input to the video monitor 60.

The video memory device 50 further comprises a control circuit 56, an AND circuit 57 for controlling the writing of data, an AND circuit 58 for controlling the reading of data, and a channel selector 59 for designating a desired channel to receive. The control circuit 56 has a microcomputer as its main component. The control circuit 56 outputs a write address to the AND circuit 57, for each communication channel the receiver 20 has received. The AND circuit 57 supplies the write address to the RAM 51 for only the interval the AND circuit 43 of the switching device 40 keeps outputting a control signal. Therefore, the video signals forming one video frame, which are inserted in the desired channel, are stored into the RAM 51. Once these video signals have been stored into the RAM 51, the control circuit 56 outputs the read address repeatedly to read the video signals from the RAM 15, until the receiver 20 receives the desired communication channel upon lapse of 1-TDMA frame time. The read address is input to the AND circuit 58 for controlling the reading of data. The AND circuit 58 opens in response to the gate signal generated by the sync signal generator 55 and remains open, except for the intervals during which the synchronizing signals are being inserted into the communication channel. Hence, the read address is repeatedly input to the RAM 51 through the AND circuit 58 at all times, but not while the synchronizing signals are being inserted into the communication channel, and one video frame is read from the RAM 51 repeatedly. The video frame is converted into analog video signals by means of the D/A converter 53. The signal synthesizer 54 synthesizes each analog video signal with the synchronizing signals, thus forming a composite video signal. The composite video signal is supplied to video monitor 60. The monitor 60 therefore displays a still picture or a strobe-effect sequence of pictures, which has been reproduced from the television signals inserted in the desired communication channel received by the receiver 20.

The operation of the television signal transmission system, described above, will now be explained. As has been pointed out, the communication channels CHA to CHD of the TDMA frame are assigned to the transmitting stations T1 to T4, in one-to-one correspondence. The transmitting station T1 sets the transmission interval for the channel CHA, and transmits one video frame during every transmission interval to the communications satellite S. The satellite S relays the television signals transmitted from the station T1, to the transmitting stations T2, T3, and T4, as well as to the receiving stations R1 to Rm. The transmitting stations T1, T2, and T3 determines, from the times they have received the television signals, the intervals during which the channels CHB, CHC, and CHD assigned to them are to be transmitted. The transmitting stations T2, T3, and T4 transmit video frames during the transmission intervals thus determined.

In each transmitting stations, to transmit the television signals, the signal-superposing unit 110 superposes a channel discriminant signal formed of a subcarrier (2.3 MHz) on two of the vertical synchronizing signals as is shown in FIG. 4. As a result, the two vertical synchronizing signals are set at such specific levels as are shown in FIG. 6, representing the communication channel assigned to the transmitting station. To be more specific, in the case of the transmitting station T2 to which the communication channel CHB is assigned, the two vertical synchronizing signals are set at the "0" level and the "1" level, respectively, thus representing the communication channel CHB; in the case of the transmitting station T4 to which the communication channel CHD is assigned, the two vertical synchronizing signals are set at the "1" level and the "1" level, respectively, thus representing the communication channel CHD.

On the other hand, in each of the receiving stations R1 to Rm, the antenna 10 catches the television signals transmitted from the transmitting stations T1 to T4 and relayed by the communications satellite S, and the receiver 20 receives the television signals. In the FM-signal receiver 30, each television signal output from the receiver 20 is frequency-demodulated and then divided into a composite video signal and a multiplexed audio/-data signal. The multiplexed audio/data signal is subjected to the QPSK demodulation.

The composite video signal and the multiplexed audio/data signal, both output from the FM-signal receiver 30, are input to the switching device 40. In the switching device 40, the channel detector 42 detects the channel discriminant signal which is superposed on the two vertical synchronizing signals of the composite video signal. When the channel discriminant signal is found to be identical to the channel discriminant signal selected by the channel selector 59 and representing the desired channel, the video switch 41 is turned on for the interval the receiver 20 is receiving the desired communication channel. Therefore, only those of the compositive video signals output from the FM-signal receiver 30, which are inserted in the desired communication channel, pass through the video switch 41 and then are input to the video memory device 50.

Meanwhile, also in the audio/data signal-processing circuit, the channel detector 45 detects the channel discriminant signal from the multiplexed audio/data signal. When the channel discriminant signal is found to be identical to the channel discriminant signal selected by the channel selector 59 and designating the desired communication channel, the speed converter 44 operates for the interval the receiver 20 is receiving the desired communication channel. The speed converter 44 therefore processes only those of the multiplexed audio/data signals output from the FM-signal receiver 30, which are inserted in the desired communication channel. The speed converter 44 divides each multiplexed audio/data signal into an audio signal and a data item. The data item is input to the control circuit 56.

The composite video signal, which has passed through the video switch 41, is written into, and temporarily stored in, the RAM 51 of the video memory device 50. Then, it is read out from the RAM 51 and input to the video-input terminal of the video monitor 60. The video monitor 60 therefore displays a still picture or a strobe-effect sequence of pictures, which has been reproduced from the television signals inserted in the desired communication channel received by the receiver 20. At the same time, the audio signal output from the speed converter 44 is corrected by the decoder 47, and input to the audio-input terminal of the video monitor 60. The speaker incorporated in the monitor 60 produces sound from the audio signal. The control circuit 56 performs various controls such that, in each of the receiving stations R1 to Rm, the television signals contained in the desired channel are demodulated and monitored by the video monitor 60.

As has been explained, the channel discriminant signals for identifying the communication channels CHA to CHD which are assigned to the transmitting stations T1 to T4 are superposed on the vertical synchronizing signals of the television signals before the transmitting stations T1 to T4 transmit the television signals. This technique results in the following advantages:

(1) Each communication channel need not have a time slot for containing the channel discriminant signal. The channel contains more television signals than otherwise. Hence, the television signals need not be compressed by means of digital processing, and can be transmitted as analog signals. The prior-art system of satellite TV broadcasting can apply to the system of the invention, without prominent modification.

(2) The system requires no ground communication lines to transmit the channel discriminant signals from the transmitting stations to the receiving stations. The system according to the invention can, therefore, be of a relatively small scale. Further, new receiving stations can be added to the system, and the receiving stations can be moved to other sites, without difficulties.

Moreover, since channel discriminant signals are formed of a subcarrier having a fixed frequency, i.e., 2.3 MHz, at which the television signals have the minimum spectrum level, the system has the following advantage. Even if the S/N ratio of the television signals relayed by the satellite S much decreases due to rain attenuation or the like, the channel discriminant signals can be detected from the television signals whose frequencies range over a broad range (60 Hz to 4.5 KHz).

Figure 8:
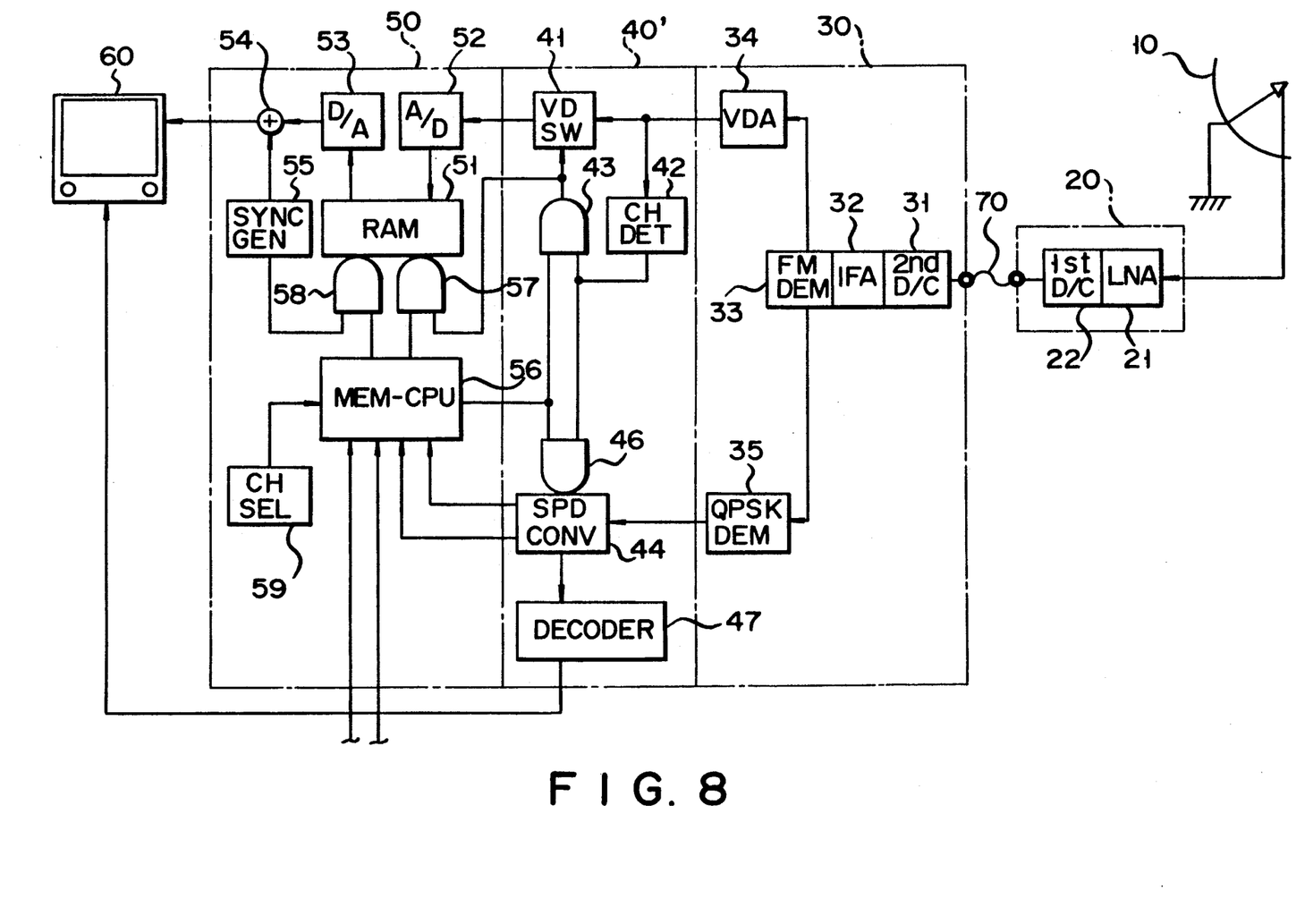
FIG. 8 is a block diagram illustrating the main components of each of the receiving stations incorporated in another television signal transmission system according to the present invention.

Another embodiment of the present invention will now be described, in which channel discriminant signals are superposed on composite video signals only and are detected from the composite video signals only, the composite video signals containing the channel discriminant signals representing the desired communication channel are selected, and the multiplexed audio/data signals corresponding to the selected composite video signals are also selected. This embodiment is therefore different from the first above embodiment in which the channel discriminant signal is superposed on both a video signal and an audio signal and is detected in each receiving station by means of both the video signal-processing circuit and the audio/data signal-processing circuit. FIG. 8 illustrates each of the receiving stations of the second embodiment. As is shown in this figure, in the switching device 40', it is only the channel detector 42 that detects the channel discriminant signal from each composite video signal. The signal output by the detector 42 is input to the AND circuit 43 for controlling the video switch 41, and also to the AND circuit 46 for controlling the speed converter 44.

In the second embodiment, each transmitting station need not add a channel discriminant signal to a television signal, and each receiving station need not detect a channel discriminant signal from the multiplexed audio/data signal. The main sections of each transmitting station and that of each receiving station can have a relatively simple circuit structure.

Figure 9:
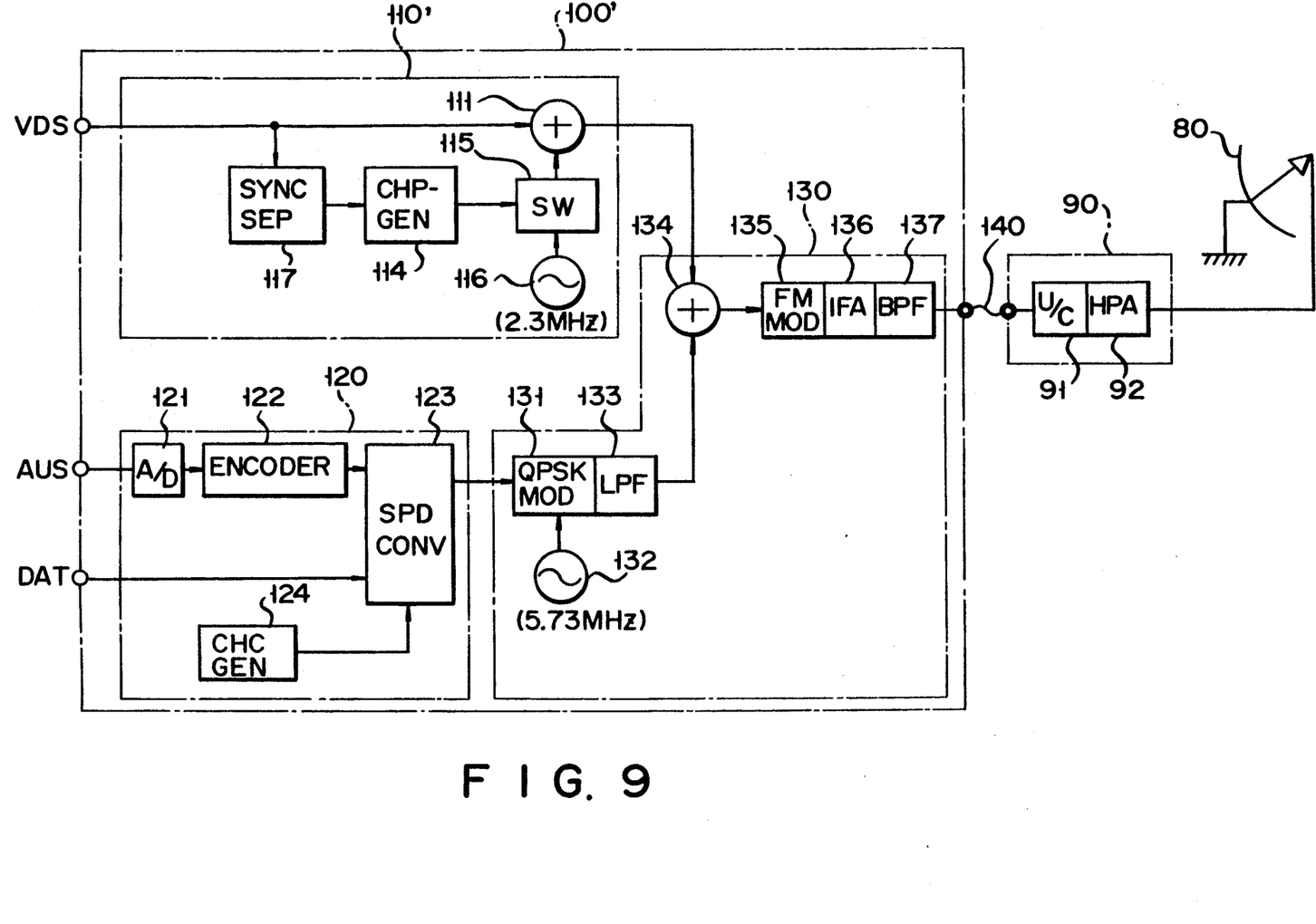
FIG. 9 is a block diagram showing the main components of each of the receiving stations incorporated in still another television signal transmission system according to this invention.

Still another embodiment of the invention will be described, with reference to FIG. 9 which illustrates the main section of each transmitting station. In the signal-superposing unit 110', a composite video signal VDS is input to the signal synthesizer 111 and the sync-signal separating circuit 117. The sync-signal separating circuit 117 separates a vertical synchronizing signal and a horizontal synchronizing signal from the composite video signal VDS. The vertical and horizontal synchronizing signals are input to the timing-pulse generator 114. The generator 114 generates a timing pulse from both synchronizing signals. The timing pulse initiates the superposing of a channel discriminant signal on the composite video signal VDS.

Since the vertical synchronizing signal and the horizontal synchronizing signal are separated from the composite video signal VDS, the signal-superposing unit 110' needs no components equivalent to the frequency multiplier 112 and the frequency divider 113, both incorporated in the signal-superposing unit 110 of each transmitting station (FIG. 3) of the first embodiment. Obviously, the unit 110' is more simple in structure than the signal-superposing unit 110 used in the first embodiment.

The present invention is not limited to the embodiments described above. For example, station discriminant signals identifying the transmitting stations can be transmitted, instead of the channel discriminant signals, from the transmitting stations to the receiving stations via the communication satellite. Alternatively, program discriminant signals identifying the TV programs can be transmitted, instead of the channel discriminant signals, from the transmitting stations to the receiving stations via the communications satellite.

Further, the present invention can apply to a television signal transmission system, wherein at least two, not only one, of the communication channels forming a TDMA frame are assigned to each transmitting station, and the television signals of the same TV program or different TV programs are inserted in the channels assigned to the transmitting station.

Moreover, the invention can apply to a television signal transmission system, wherein television signals are transmitted from the transmitting stations to the receiving stations via microwave channels installed on the ground, not via a communications satellite.

Still further, other changes and modifications can be made, without departing the scope of the invention, to the transmitting stations, the receiving stations, the number of communication channels forming the TDMA frame, the number of transmitting stations, the number of receiving stations, the format of the channel discriminant signals, and the like.

What is claimed is:

1. A television signal transmission system in which television signal is transmitted from a plurality of transmitting stations to a plurality of receiving stations by using a first carrier, the first carrier forming a plurality of communication frames at predetermined period, each communication frame being time-divided into a plurality of communication channels each of which are assigned to the transmitting stations in accordance with specific rules;

each of the transmitting stations comprising:
signal-transmitting means for inserting television signal into the communication channel assigned to the transmitting station, and for transmitting the television signal to the receiving stations; and
signal-superposing means for superposing a discriminant signal on television signal to be transmitted by said signal-transmitting means, during a vertical-blanking interval of the television signal, said discriminant signal being required for selecting the television signal being formed of a second carrier whose frequency falls within the frequency band of the television signal; and each of said receiving stations comprising:
signal-receiving means for receiving the television signals transmitted form the transmitting stations;
signal-detecting means for detecting the discriminant signals from television signal in each communication channel received by said signal-receiving means; and
signal-selecting means for selecting the television signal inserted in the desired communication channel from among the television signals received by said signal-receiving means, in accordance with the discriminant signals detected by said signal-detecting means.

2. The system according to claim 1, wherein the frequency of said second carrier has a value at which a spectrum level is minimum within the frequency band of the television signal.

3. The system according to claim 1, wherein said signal-detecting means has a narrow band-pass filter for allowing passage of only components of the television signal which are formed of the second carrier.

4. A method of transmitting a television signal from a plurality of transmitting stations to a plurality of receiving stations, by using a first carrier forming a plurality of communication frames at predetermined periods, each communication frame being time-divided into a plurality of communication channels each of which are assigned to the transmitting stations in accordance with specific rules, said method comprising the steps of:

superposing a discriminant signal on a television signal in each of the transmitting station, during a vertical-blanking interval of the television signal, said discriminant signal being required for selecting the television signal and being formed of a second carrier whose frequency falls within the frequency band of the television signal;
inserting, in each of the transmitting station, the television signal containing said discriminant signal, into said communication channel which is assigned to the transmitting station, and transmitting the television signal inserted in the communication channel to the receiving stations;
detecting, in each of the receiving stations, the discriminant signal from the television signal transmitted from the transmitting stations; and
selecting, in each of the receiving stations, the television signal inserted in the desired communication channel from among the television signals transmitted from the transmitting stations, in accordance with the discriminant signals detected.

5. A television signal transmission system, in which a television signal is transmitted from a plurality of transmitting stations to a plurality of receiving stations by way of a communications satellite, by using a first carrier whose frequency is designated by a transponder incorporated in the communications satellite, said first carrier forming a plurality of communication frames at predetermined period, each communication frame being time-divided into a plurality of communication channels which are assigned to the transmitting stations in accordance with specific rules;

each of the transmitting stations comprising:

signal-transmitting means for inserting television signal into the communication channel assigned to the transmitting station, and for transmitting the television signal to the communications satellite; and signal-superposing means for superposing a discriminant signal on television signal to be transmitted by said signal-transmitting means, during a vertical-blanking interval of the television signal, said discriminant signal being required for selecting the television signal and formed of a second carrier whose frequency falls within the frequency band of the television signal; and each of said receiving stations comprising:

signal-receiving means for receiving the television signals transmitted from the transmitting stations via sad communications satellite;

signal-detecting means for detecting the discriminant signals from television signal in each communication channel received by said signal-receiving means; and signal-selecting means for selects the television signal inserted in the desired communication channel from among the television signals received by said signal-receiving means, in accordance with the discriminant signals detected by said signal-detecting means.

6. The system according to claim 5, wherein the frequency of said second carrier has a value at which a spectrum level is minimum within the frequency band of the television signal.

7. The system according to claim 5, wherein said signal-detecting means has a narrow band-pass filter for a long passage of only components of the television signal which are formed of the second carrier.

8. A transmitting station for use in a television signal transmission system, wherein television signal is transmitted from a plurality of transmitting stations to a plurality of receiving stations by way of a communications satellite, by using a first carrier whose frequency is designated by a transponder incorporated in the communications satellite, said first carrier forming a plurality of communication frames at predetermined period, each communication frame being time-divided into a plurality of communication channels which are assigned to the transmitting stations in accordance with specific rules;

said transmitting station comprising:

signal-transmitting means for inserting television signal into the communication channel assigned to the transmitting station, and for transmitting the television signal to the communications satellite; and signal-superposing means for superposing a discriminant signal on television signal to be transmitted by said signal-transmitting means, during a vertical-blanking interval of the television signal, said discriminant signal being required for selecting the television signal and formed of a second carrier whose frequency falls within the frequency band of the television signal.

9. A receiving station for use in a television signal transmission system, wherein television signal is transmitted from a plurality of transmitting stations to a plurality of receiving stations by way of a communications satellite, by using a first carrier whose frequency is designated by a transponder incorporated in the communications satellite, said first carrier forming a plurality of communication frames at predetermined period, each communication frame being time-divided into a plurality of communication channels which are assigned to the transmitting stations in accordance with specific rules;

said receiving station comprising:

signal-receiving means for receiving the television signal transmitted from the transmitting stations via said communications satellite;

signal-detecting means for detecting a discriminant signal, which is formed of a second carrier whose frequency falls within the frequency band of the television signal, from the television signal in each communication channel received by said signal-receiving means; and signal-selecting means for selects the television signal inserted in the desired communication channel from among the television signals received by said signal-receiving means, in accordance with the discriminant signals detected by said signal-detecting means.

10. The transmitting station according to claim 9, wherein the frequency of said second carrier has a value at which a spectrum level is minimum within the frequency band of the television signal.

11. The receiving station according to claim 9, wherein said signal-detecting means has a narrow band-pass filter for allowing passage of only components of the television signal which are formed of the second carrier.

* * * * *